US006375752B1

(12) United States Patent
Otsuki et al.

(10) Patent No.: US 6,375,752 B1
(45) Date of Patent: *Apr. 23, 2002

(54) METHOD OF WET-CLEANING SINTERED SILICON CARBIDE

(75) Inventors: Masashi Otsuki, Musashimurayama; Shigeki Endo, Tokorozawa, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,064

(22) Filed: May 26, 2000

(30) Foreign Application Priority Data

Jun. 29, 1999 (JP) ............................................ 11-183136

(51) Int. Cl.⁷ ............................. B08B 7/00; B08B 7/04; B08B 3/12
(52) U.S. Cl. ...................... 134/1; 134/2; 134/3; 134/26; 134/27; 134/28
(58) Field of Search .............................. 134/1, 1.3, 2, 3, 134/26, 27, 28, 29

(56) References Cited

U.S. PATENT DOCUMENTS 5,589,116 A * 12/1996 Kojima et al.

FOREIGN PATENT DOCUMENTS

| JP | A-61-6110 | | 1/1986 |
| JP | 2-16678 | * | 5/1990 |
| JP | 3-146470 | * | 6/1991 |
| JP | 5-17229 | * | 1/1993 |
| JP | A-5-24818 | | 2/1993 |
| JP | 6-77310 | * | 3/1994 |
| JP | 8-151267 | * | 6/1996 |
| JP | A-10-67565 | | 3/1998 |

* cited by examiner

*Primary Examiner*—Alexander Markoff
(74) *Attorney, Agent, or Firm*—Oliff & Berridge, PLC

(57) ABSTRACT

A method of wet-cleaning a sintered silicon carbide to remove, easily and within a short period of time, organic and inorganic impurities present on a surface and in a vicinity of the surface of the sintered silicon carbide. The method includes steps of: dipping the sintered silicon carbide into a quasi-aqueous organic solvent; and dipping the sintered silicon carbide into an aqueous solution of an inorganic acid, wherein at least one of the steps is conducted while ultrasonic waves are applied.

15 Claims, No Drawings

METHOD OF WET-CLEANING SINTERED SILICON CARBIDE

BACKGROUND OF THE INVENTION

1. Field of the Invention

The present invention relates to a method of wet-cleaning a sintered silicon carbide, which can be applied to various members of semiconductors and to electronic parts. More particularly, the present invention relates to a method of removing organic contaminants, metal element contaminants, particle contaminants and the like from a sintered silicon carbide which is used for dummy wafers, targets, heating elements and the like, which is parts of semiconductors, and which is required to have a high purity.

2. Description of the Related Art

A silicon carbide is a substance with strong covalent bonds, and has conventionally been put to many uses which take advantage of its excellent characteristics, such as excellent strength at high temperatures, heat resistance, wear resistance, resistance to chemicals, and the like. These advantageous characteristics have attracted attention, and recently expectations have been placed on the application of silicon carbides to the fields of electronics, information and semiconductors.

As the degree of integration in semiconductor integrated circuits using silicon substrate increases and the line width of the circuits becomes correspondingly smaller, various members of semiconductors and electronic parts used in these fields are required to have a higher purity and a higher density. Therefore, methods of hot press sintering and methods of reaction sintering using nonmetallic auxiliary sintering agents have been extensively researched. However, while the sintered silicon carbides obtained through these sintering methods have a high level of purity and a high density, the surfaces and the vicinities of the surfaces of the sintered silicon carbides become contaminated during processes before and after manufacture, such as sintering, working, handling, and the like.

Therefore, in order to apply a sintered silicon carbide to various parts of semiconductors and electronic parts, i.e., in order to prevent particle and other forms of contamination, achieving a level of surface purity as high as that of silicon wafers by cleaning the surface of the sintered silicon carbide is essential.

Disclosed methods of cleaning sintered silicon carbides are as follows: (1) in the method disclosed in Japanese Patent No. 181841, a sintered silicon carbide is cleaned with an acid, subjected to an oxidation treatment at a temperature of 1200° C. or higher, and is thereafter surface-treated in an atmosphere of nitrogen; (2) in the method disclosed in Japanese Patent Application Laid-Open (JP-A) No. 5-17229, a sintered silicon carbide is blast-cleaned with silica abrasive grains, and is then wet-cleaned with a mixed acid containing hydrofluoric acid and nitric acid; (3) in the method disclosed in JP-A No. 6-77310, a sintered silicon carbide is cleaned by dipping it into an aqueous solution of hydrofluoric acid, rinsed with ultrapure water, dry-cleaned with oxygen and a halogen gas, and is then treated with oxygen; and (4) in methods disclosed in JP-A Nos. 55-158622, 60-138913 and 64-72964, a porous silicon carbide is cleaned with a hydrogen halide gas and an inorganic acid to increase the purity, and then the purified silicon carbide is subjected to secondary sintering because achieving a high level of purity is extremely difficult once the sintering has been conducted.

Because the aforementioned methods require not only simply wet-cleaning the sintered silicon carbide but also such treatments as oxidation, blast cleaning, and secondary sintering, the entire process becomes complicated and it is difficult to regard them as satisfactory cleaning methods.

SUMMARY OF THE INVENTION

The present invention was created in consideration of the above facts. An object of the present invention is to provide a method of wet-cleaning a sintered silicon carbide to, easily and within a short period of time, remove organic and inorganic impurities which are present on the surface and in the vicinity of the surface of the sintered silicon carbide so that the sintered silicon carbide can be used in various parts of semiconductors and electronic parts.

As a result of their extensive research, the present inventors noted that, even when a sintered silicon carbide is of a high purity, a high density, and is applicable to various parts of semiconductors and electronic parts, concentrations of organic and inorganic impurities on the surface and in the vicinity of the surface markedly increase due to contamination in succeeding steps, thus making it difficult to apply the obtained sintered silicon carbide to various parts of semiconductors and electronic parts. The present inventors therefore devised a method which cleans and removes organic and inorganic impurities easily and within a short period of time.

That is, the present invention is a method of wet-cleaning a sintered silicon carbide, comprising the steps of: dipping a sintered silicon carbide into a quasi-aqueous organic solvent; and dipping the sintered silicon carbide into an aqueous solution of an inorganic acid, wherein at least one of the step of dipping the sintered silicon carbide into a quasi-aqueous organic solvent and the step of dipping the sintered silicon carbide into an aqueous solution of an inorganic acid is conducted while ultrasonic waves are applied.

The method of wet-cleaning a sintered silicon carbide of the present invention can clean, easily and within a short period of time, a sintered silicon carbide such that the resultant sintered silicon carbide has a degree of surface cleanliness (amount of impurities adhering thereto) less than $1 \times 10^{11}$ atoms/cm$^2$ and can be applied to various members of semiconductors and electronic parts.

The method of wet-cleaning a sintered silicon carbide of the present invention has an advantage in that, since the cleaning liquids (solvents and aqueous solutions) are all composed of agents which are soluble in water or can be rinsed with water, no drying process is required in the step of cleaning and, therefore, the entire process can be simplified.

DESCRIPTION OF THE PREFERRED EMBODIMENTS

A method of wet-cleaning a sintered silicon carbide of the present invention includes a step of dipping a sintered silicon carbide (hereinafter occasionally referred to as a material to be cleaned) into a quasi-aqueous organic solvent, and a step of dipping the material to be cleaned into an aqueous solution of inorganic acid. At least one of these steps is conducted while ultrasonic waves are applied.

In the method of wet-cleaning a sintered silicon carbide of the present invention, by dipping the sintered silicon carbide into a quasi-aqueous organic solvent, organic substances on the surface of the sintered silicon carbide, such as oil film, fingerprints and wax, are removed by the quasi-aqueous organic solvent. Moreover, by dipping the sintered silicon carbide into the aqueous solution of inorganic acid, metal elements on the surface and in the vicinity of the surface of the sintered silicon carbide are removed by the aqueous solution of inorganic acid.

In the method of wet-cleaning a sintered silicon carbide of the present invention, at least one of the steps is conducted while ultrasonic waves are applied, so that physical vibrations are applied to the material to be cleaned or the cleaning liquid (the solvent and/or the aqueous solution), and an active radicals are generated in the cleaning liquid, whereby impurities present on the surface and in the vicinity of the surface of the sintered silicon carbide can easily be removed. As a result, the cleaning effect can be improved remarkably, and the process can be conducted simply and efficiently with a small number of steps. Moreover, the time required for the process can be drastically reduced compared to cases in which ultrasonic waves of low frequency are applied.

In the method of wet-cleaning a sintered silicon carbide of the present invention, it is preferable, from the standpoint of the cleaning effect and process simplification, that ultrasonic waves are applied only during the step of dipping the sintered silicon carbide into an aqueous solution of an inorganic acid.

In the method of wet-cleaning a sintered silicon carbide of the present invention, the expression "a step is conducted while ultrasonic waves are applied" means that a process is carried out while the material to be cleaned is vibrated with ultrasonic waves, or that ultrasonic vibrations are applied to the cleaning liquid (the solvent and/or the aqueous solution) while sweeping the frequency of the ultrasonic vibrations.

(The Applied Ultrasonic Waves)

The frequency of the applied ultrasonic waves is preferably 700 kHz or higher, more preferably 900 kHz or higher, and most preferably 1 MHz or higher. When the frequency of the ultrasonic waves exceeds 3 MHz, there is the possibility that the cleaning liquid is scattered around or that the temperature of the cleaning liquid rises above a predetermined temperature, so that such a frequency is not preferable. When the frequency of the ultrasonic waves is lower than 700 kHz, the cleaning effect is unsatisfactory, so that such a frequency is not preferable either.

The intensity (output) of the applied ultrasonic waves is preferably 500 W/cm$^2$ or higher, more preferably 900 W/cm$^2$ or higher and most preferably 1 kW/cm$^2$ or higher. When the intensity of the ultrasonic waves exceeds 3 kW/cm$^2$, there is the possibility that the cleaning liquid is scattered around or that the temperature of the cleaning liquid rises above a predetermined temperature, so that such an intensity is not preferable. When the intensity of the ultrasonic waves is lower than 500 W/cm$^2$, the cleaning effect is unsatisfactory, so that such an intensity is not preferable either.

There are no restrictions on the types of ultrasonic wave generator used to generate the applied ultrasonic waves, as long as the ultrasonic wave generator generates ultrasonic waves which satisfy the above-described conditions such as frequency and intensity. However, when the ultrasonic wave generator is used in the step of dipping the sintered silicon carbide into an aqueous solution of an inorganic acid, an indirect method of applying the ultrasonic waves is preferable. When the ultrasonic wave generator is used in other steps, a direct method of application is preferable.

(Step of Dipping the Sintered Silicon Carbide into the Quasi-Aqueous Organic Solvent)

The step of dipping the sintered silicon carbide into the quasi-aqueous organic solvent is a step in which organic substances adhering to the surface and in the vicinity of the surface of the sintered silicon carbide are removed.

Quasi-aqueous organic solvent means an organic solvent which is soluble in water or an organic solvent which can be removed easily by washing with water although the solvent itself is insoluble in water. Examples of the quasi-aqueous organic solvent used in the present invention include a solvent soluble in water, a solvent obtained by partially introducing hydrophilic groups into a solvent insoluble in water, or a solvent obtained by adding surfactants to a solvent insoluble in water in advance.

Specific examples of the quasi-aqueous organic solvent include petroleum hydrocarbons, esters of organic acids, glycol ethers, mixed solvents of these solvents, mixtures of the solvent and a surfactant(s) and mixtures of the mixed solvents and a surfactant(s).

Examples of the mixed solvents and mixtures include mixed solvents of petroleum hydrocarbons and esters of organic acid or glycol ethers, mixtures of petroleum hydrocarbons, surfactants and esters of organic acids or glycol ethers, mixtures of petroleum hydrocarbons and surfactants, and mixtures of esters of organic acids and surfactants.

Examples of the petroleum hydrocarbons include aliphatic hydrocarbons as naphthenes and hexane.

Examples of the esters of organic acid include esters of fatty acids such as esters of methyl fatty acids, glycerol esters, and sorbitan esters.

Examples of the glycol ethers include propylene glycol ether, propylene glycol methyl ether, and diethylene glycol dimethyl ether.

The surfactant is not particularly limited as long as the surfactant exhibits the desired effect. Preferable examples of the surfactant include nonionic surfactants such as polyoxyethylene methyl fatty acids, alkylamine oxides, polyoxyalkylene glycols, and products of ethylene oxide or propylene oxide added to alkylamines.

In the step of dipping the sintered silicon carbide into a quasi-aqueous organic solvent, the sintered silicon carbide is preferably dipped for 2 to 60 minutes, more preferably 10 to 30 minutes, and most preferably 10 to 15 minutes, although the time period varies depending on the amount and the type of organic substances adhering to the sintered silicon carbide. When the step is conducted while high frequency ultrasonic waves are applied, a dipping time of 2 to 5 minutes is preferable.

In the step of dipping the sintered silicon carbide into a quasi-aqueous organic solvent, conducting this step after heating the solvent to a temperature of 50° C. to 70° C. is effective from the standpoint of enhancing the ability of solvent to dissolve organic substances adhering to the sintered silicon carbide.

(Step of Dipping Sintered Silicon Carbide into an Aqueous Solution of Inorganic Acid)

The step of dipping the sintered silicon carbide into an aqueous solution of an inorganic acid is a step in which metal impurities adhering to the surface and in the vicinity of the surface of the sintered silicon carbide are removed.

Examples of the aqueous solution of an inorganic acid include an aqueous solution of hydrofluoric acid, an aqueous solution of nitric acid, an aqueous solution of sulfuric acid, an aqueous solution of hydrochloric acid, and aqueous solutions of mixtures of these acids. Examples of the aqueous solutions of mixtures of these acids include an aqueous mixture of hydrofluoric acid and nitric acid; aqueous solutions of mixtures of hydrofluoric acid, nitric acid and sulfuric acid; and aqueous solutions of mixtures of hydrofluoric acid and hydrochloric acid.

The concentration of the aqueous solution of an inorganic acid is preferably 0.3 to 68% by weight, more preferably 1 to 40% by weight and most preferably 5 to 10% by weight. When the concentration is less than 0.3% by weight, the effect of removing metal impurities may be unsatisfactory. When the concentration exceeds 68% by weight, the surface of the material to be cleaned may become rough.

To the aqueous solution of an inorganic acid, a nonionic surfactant may be added in order to prevent metal ions dissolved into the solution from re-adhering to the material to be cleaned. Examples of the nonionic surfactant include the surfactants described above.

In the step of dipping the sintered silicon carbide into an aqueous solution of an inorganic acid, the sintered silicon carbide is preferably dipped for 5 to 120 minutes, more preferably 10 to 60 minutes, and most preferably 20 to 30 minutes. When the step is conducted while high frequency ultrasonic waves are applied, however, a dipping time of 2 to 5 minutes is preferable.

In the method of wet-cleaning a sintered silicon carbide of the present invention, the temperature of the cleaning liquid in at least one of the above steps is adjusted to be preferably 30° C. or higher, more preferably 40° C. or higher, and most preferably 50° C. or higher to improve the ability of the cleaning liquid to dissolve undesirable impurities and adhering substances. The maximum value of the above temperature is at or lower than the boiling point of the cleaning liquid used. However, when dipping the sintered silicon carbide into the quasi-aqueous organic solvent, the temperature of the cleaning liquid is adjusted to be preferably at or lower than a temperature 20° C. lower than the flash point. Performing this temperature adjustment during the step of dipping the sintered silicon carbide into the quasi-aqueous organic solvent is especially effective.

In the method of wet-cleaning a sintered silicon carbide of the present invention, an additional step of dipping the sintered silicon carbide into cleaning water may be conducted between the above steps, although such additional step is not particularly necessary from the standpoint of the cleaning effect. Conducting this step, for example, after dipping the sintered silicon carbide into the quasi-aqueous organic solvent makes it difficult to contaminate the aqueous solution used in the following step, since solvent adhering to the material to be cleaned can easily be washed away.

Pure water, distilled water or ion-exchanged water can be used for the cleaning water. Pure water is preferable from the standpoint of preventing reverse contamination, in the step of dipping into cleaning water, of the material to be cleaned. For the pure water, water having a purity level of 100 ppt or less and a specific resistance of 16 to 18 MΩ is preferable and water having a purity level of less than 10 ppt is more preferable.

In the step of dipping the sintered silicon carbide into the cleaning water, the sintered silicon carbide is preferably dipped for 2 to 60 minutes, more preferably 5 to 30 minutes, and most preferably 10 to 20 minutes.

In the step of dipping the sintered silicon carbide into the cleaning water, an overflow process may be used so that the material to be cleaned is continually washed with fresh cleaning water. A combination of an overflow process and a cascade process may also be used.

In the method of wet cleaning a sintered silicon carbide of the present invention, the sintered silicon carbide which is the material to be cleaned is not particularly limited, as long as the sintered silicon carbide is of a high density and a high purity, and can be used for various members of semiconductors and electronic parts. For example, the method can be applied to silicon carbides sintered by hot pressing using a nonmetallic auxiliary sintering agent, and the sintered silicon carbides described in Japanese Patent Application No. 10-67565 which has been filed by the present applicant.

It is preferable that the apparatuses and instruments used for the method of wet-cleaning a sintered silicon carbide of the present invention are made of polyvinyl chloride (PVC) which has excellent chemical resistance, and are more preferably made of a polyvinyl chloride which has been subjected to a treatment to make the polyvinyl chloride having high purity. It is also preferable that surfaces of heaters and the like are coated with Teflon.

The sintered silicon carbide obtained though the method of wet-cleaning a sintered silicon carbide of the present invention can be suitably used for various members of semiconductors and electronic parts. Examples of the members of semiconductors include members required to have a high purity and to be free from particles, such as dummy wafers, heaters, electrodes for plasma etching, and targets in ion injection apparatuses.

The present invention will now be described with reference to the following Examples. However, the present invention is not limited to these Examples.

(Material to be Cleaned)

All of the following Examples and the material to be cleaned (sintered silicon carbide) used in the Examples were evaluated by using the same sample. The material to be cleaned was a flat plate of 40×40×2t. One face of the flat plate was rough-ground, and the other face was polished to form a mirror finished surface. The degree of cleanliness of the surface (the amount of impurities adhering to the surface) prior to cleaning is shown in Table 1.

(Measurement of Degree of Cleanliness of Surface (Amount of Adhered Impurities))

The degree of cleanliness of the surface (the amount of adhered impurities) was measured and then analyzed by using a Total Reflection X-Ray Fluorescencemeter (TXRF). In the analysis using the TXRF, a relative sensitivity coefficient based on silicon was used.

EXAMPLE 1

The material to be cleaned was dipped into a quasi-aqueous organic solvent (a mixed solvent containing a petroleum hydrocarbon, an ester of an organic acid and a nonionic surfactant) at 50° C. for 5 minutes while ultrasonic waves (1 MHz, 900 W/cm$^2$) were applied, then dipped into an aqueous solution of inorganic acid (an aqueous solution mixture of hydrofluoric acid and nitric acid (38% hydrofluoric acid: 68% nitric acid: water=1:1:20)) for 60 minutes, and then the degree of cleanliness of the surface was measured. The resultant degree of cleanliness of the surface material to be cleaned is shown in Table 1. In each of the above treatments, except the treatment of dipping the material to be cleaned into the quasi-aqueous organic solvent, the temperature of the cleaning liquids was kept at room temperature.

EXAMPLE 2

The material to be cleaned was dipped into a quasi-aqueous organic solvent (a mixed solvent containing a petroleum hydrocarbon, an ester of an organic acid and a nonionic surfactant) for 20 minutes while ultrasonic waves (26 kHz–100V) were applied, then dipped into an aqueous solution of an inorganic acid (an aqueous solution of hydrofluoric acid (38% hydrofluoric acid: water=1:10)) for 2 minutes while ultrasonic waves (1 MHz, 900 W/cm$^2$) were applied, and then the degree of cleanliness of the surface was measured. The resultant degree of cleanliness of the surface of the material to be cleaned is shown in Table 1. In each of the above treatments, the temperature of the cleaning liquids was kept at room temperature.

EXAMPLE 3

The material to be cleaned was dipped into a quasi-aqueous organic solvent (a mixed solvent containing a petroleum hydrocarbon, an ester of an organic acid and a nonionic surfactant) for 20 minutes while ultrasonic waves (26 kHz–100V) were applied, then dipped into an aqueous solution of an inorganic acid containing 3% nonionic surfactant (an aqueous solution of hydrofluoric acid (38% hydrofluoric acid: water=1:10)) for 2 minutes while ultrasonic waves (1 MHz, 900 W/cm$^2$) were applied, and then the degree of cleanliness of the surface was measured. The resultant degree of cleanliness of the surface of the material to be cleaned is shown in Table 1. In each of the above treatments, the temperature of the cleaning liquids was kept at room temperature.

COMPARATIVE EXAMPLE 1

The same procedures as those in Example 1 were conducted except that the ultrasonic waves were not applied, and then the degree of cleanliness of the surface was measured. The resultant degree of cleanliness of the surface of the material to be cleaned is shown in Table 1.

TABLE 1

| Impurities | Prior to Cleaning | Example 1 | Example 2 | Example 3 | Comparative Example 1 |
|---|---|---|---|---|---|
| K  | 73500  | 0.9 | <0.9 | <0.9 | 370   |
| Ca | 24300  | 1.8 | <1.5 | <1.5 | 520   |
| Ti | 6180   | 4.5 | 1.5  | <1.0 | 460   |
| Cr | 8460   | 0.9 | 0.9  | <0.9 | 390   |
| Fe | 25200  | 6.3 | 1.2  | <1.0 | 2630  |
| Ni | 76500  | 1.8 | 1.5  | <1.0 | 5395  |
| Cu | 153800 | 4.8 | 2.2  | <1.0 | 17240 |
| Zn | 14500  | 2.5 | 1.5  | <1.0 | 7400  |

Note: The unit of the numbers in Table 1 is × 10$^{10}$ atoms/cm$^2$.

As Table 1 shows, the sintered silicon carbides treated by the method of wet-cleaning of the present invention had a degree of surface cleanliness less than 1×10$^{11}$ atoms/cm$^2$ and can be applied to various members of semiconductors and electronic parts.

As described above, the present invention provides a method of wet-cleaning a sintered silicon carbide whereby organic and inorganic impurities present on the surface and in the vicinity of the surface of a sintered silicon carbide can be removed easily and within a short period of time.

What is claimed is:

1. A method of wet-cleaning a sintered silicon carbide, comprising the steps of:
    dipping a sintered silicon carbide into a quasi-aqueous organic solvent; and
    dipping the sintered silicon carbide into an aqueous solution of an inorganic acid,
    wherein at least one of the step of dipping the sintered silicon carbide into a quasi-aqueous organic solvent and the step of dipping into an aqueous solution of an inorganic acid is conducted while ultrasonic waves are applied.

2. A method of wet-cleaning a sintered silicon carbide according to claim 1, wherein a frequency of the ultrasonic waves is 700 kHz or higher.

3. A method of wet-cleaning a sintered silicon carbide according to claim 1, wherein a frequency of the ultrasonic waves is 900 kHz or higher.

4. A method of wet-cleaning a sintered silicon carbide according to claim 1, wherein a frequency of the ultrasonic waves is 1 MHz or higher.

5. A method of wet-cleaning a sintered silicon carbide according to claim 1, wherein an output of the ultrasonic waves is 500 W/cm$^2$ or higher.

6. A method of wet-cleaning a sintered silicon carbide according to claim 1, wherein an output of the ultrasonic waves is 900 W/cm$^2$ or higher.

7. A method of wet-cleaning a sintered silicon carbide according to claim 1, wherein an output of the ultrasonic waves is 1 KW/cm$^2$ or higher.

8. A method of wet-cleaning a sintered silicon carbide according to claim 1, wherein the step of dipping the sintered silicon carbide into an aqueous solution of an inorganic acid is conducted while the ultrasonic waves are applied.

9. A method of wet-cleaning a sintered silicon carbide according to claim 1, wherein the step of dipping the sintered silicon carbide into a quasi-aqueous organic solvent is conducted while the ultrasonic waves are applied.

10. A method of wet-cleaning a sintered silicon carbide according to claim 1, wherein a temperature of the quasi-aqueous organic solvent or a temperature of the aqueous solution of an inorganic acid is 30° C. or higher.

11. A method of wet-cleaning a sintered silicon carbide according to claim 1, wherein a temperature of the quasi-aqueous organic solvent is 50 to 70° C.

12. A method of wet-cleaning a sintered silicon carbide according to claim 1, wherein the quasi-aqueous organic solvent is selected from the group consisting of petroleum hydrocarbons, esters of an organic acid, glycol ethers, a mixed solvent of any of these solvents, a mixture of a surfactant and any of these solvents, and a mixture of any of these mixed solvents and a surfactant.

13. A method of wet-cleaning a sintered silicon carbide according to claim 1, wherein the aqueous solution of an inorganic acid is selected from the group consisting of an aqueous solution of hydrofluoric acid, an aqueous solution of nitric acid, an aqueous solution of sulfuric acid, an aqueous solution of hydrochloric acid, and an aqueous solution of a mixture of these acids.

14. A method of wet-cleaning a sintered silicon carbide according to claim 1, wherein the quasi-aqueous organic solvent and the aqueous solution of an inorganic acid contain a nonionic surfactant.

15. A method of wet-cleaning a sintered silicon carbide according to claim 1, wherein the sintered silicon carbide is a member of a semiconductor.

* * * * *